US009522734B2

(12) United States Patent
Mazidi et al.

(10) Patent No.: US 9,522,734 B2
(45) Date of Patent: Dec. 20, 2016

(54) MOUNTING SYSTEM FOR MOUNTING AN OBJECT IN A SPACE OF A TRANSPORTATION MEANS AND TRANSPORTATION MEANS WITH A SPACE AND AT LEAST ONE SUCH MOUNTING SYSTEM

(71) Applicant: Airbus Operations GmbH, Hamburg (DE)

(72) Inventors: Seraj Mazidi, Hamburg (DE); Frank Quatmann, Hamburg (DE)

(73) Assignee: Airbus Operations GmbH (DE)

( * ) Notice: Subject to any disclaimer, the term of this patent is extended or adjusted under 35 U.S.C. 154(b) by 123 days.

(21) Appl. No.: 14/464,033

(22) Filed: Aug. 20, 2014

(65) Prior Publication Data
US 2015/0053838 A1    Feb. 26, 2015

(30) Foreign Application Priority Data

Aug. 21, 2013    (DE) .................. 10 2013 109 049

(51) Int. Cl.
*B60P 7/08*     (2006.01)
*B64D 11/00*    (2006.01)
(Continued)

(52) U.S. Cl.
CPC .......... *B64D 11/0023* (2013.01); *B60P 7/0815* (2013.01); *B64D 11/0696* (2013.01); *F16M 13/022* (2013.01); *Y02T 50/46* (2013.01)

(58) Field of Classification Search
CPC ............ B64D 11/0023; B64D 11/0696; F16M 13/022; Y02T 13/022; B60P 7/0815
(Continued)

(56) References Cited

U.S. PATENT DOCUMENTS 5,489,172 A    2/1996   Michler
6,357,814 B1   3/2002   Boisset et al.
(Continued)

FOREIGN PATENT DOCUMENTS

DE           19851392 A1    5/1999
DE    10 2008 048 744 A1   4/2010
(Continued)

OTHER PUBLICATIONS

German search report (App 10 2013 109 049.4) dated Feb. 7, 2014.
European search report dated Feb. 12, 2015.

*Primary Examiner* — Stephen Gordon
(74) *Attorney, Agent, or Firm* — Lerner, David, Littenberg, Krumholz & Mentlik, LLP

(57) ABSTRACT

A mounting system for objects in a transportation system includes a profile rail, at least one locking device with a base body that is bringable in surface contact with a supporting surface of the profile rail and at least one locking body which is interlockable with the profile rail, as well as an actuating device with an actuating element that extends parallel to the profile rail and a clamping body that is connected to the actuating element. The clamping body is realized in such a way that it exerts a compressive force, which results in the locking body being interlocked, upon a component of the locking device during a motion of the actuating element in a first direction parallel to the profile rail and releases the interlock during a motion of the actuating element in a second, opposite direction.

11 Claims, 5 Drawing Sheets

(51) Int. Cl.
*B64D 11/06* (2006.01)
*F16M 13/02* (2006.01)

(58) Field of Classification Search
USPC ............ 410/8, 104, 105, 106, 116; 248/503, 248/503.1; 244/118.1, 118.6, 137.1
See application file for complete search history.

(56) References Cited

U.S. PATENT DOCUMENTS

| | | | |
|---|---|---|---|
| 7,857,561 B2 * | 12/2010 | Mejuhas | B60P 7/0815 410/105 |
| 2007/0138821 A1 | 6/2007 | Mejuhas et al. | |
| 2010/0071488 A1 | 3/2010 | Steinbeck | |
| 2010/0074680 A1 | 3/2010 | Vine | |
| 2010/0314495 A1 | 12/2010 | Dazet et al. | |
| 2011/0133032 A1 | 6/2011 | Marechal | |
| 2012/0145857 A1 | 6/2012 | Grunewald | |

FOREIGN PATENT DOCUMENTS

| | | |
|---|---|---|
| DE | 10 2008 048 745 A1 | 5/2010 |
| DE | 20 2011 108 804 U1 | 1/2012 |
| EP | 1 792 827 A2 | 6/2007 |
| EP | 2 441 672 A1 | 4/2012 |
| FR | 2 926 062 A1 | 7/2009 |

\* cited by examiner

MOUNTING SYSTEM FOR MOUNTING AN OBJECT IN A SPACE OF A TRANSPORTATION MEANS AND TRANSPORTATION MEANS WITH A SPACE AND AT LEAST ONE SUCH MOUNTING SYSTEM

BACKGROUND OF THE INVENTION

The invention relates to a mounting system for mounting an object in a space of a transportation means and to a transportation means with a space and at least one such mounting system.

In order to mount objects in a space of a transportation means, it is known to arrange profile rails, on which the objects can be locked, in a floor. These profile rails frequently comprise a slot that extends along the longitudinal direction of the profile rail and is interspersed with circular openings that are spaced apart from one another. Locking devices interlock the objects with the profile rail in that a non-positive and/or positive connection between the locking device and the profile rail is produced and the object is connected to the locking device.

In an aircraft cabin, for example, two profile rails that are spaced apart from one another and extend parallel to one another are respectively used, wherein seats, monuments, partition walls or other devices are arranged on these profile rails. The profile rails are realized in such a way that a positive and non-positive mounting can be realized with the aid of locking devices in a predefined grid such as, for example, a one-inch grid.

In order to reconfigure a cabin layout that comprises a plurality of seats, it is necessary to release all locking devices, to displace the respective seats into a new position and to subsequently once again interlock all locking devices. A group of two, three, four or five seats usually comprises a common frame that is mounted on the profile rails by means of four locking devices. Consequently, an immense effort is required for releasing and locking passenger seats and other devices in order to reconfigure a larger cabin layout.

DE 10 2008 048 744 A1 discloses a device that is installed on one or several interconnected passenger seats and serves for moving passenger seats on a rail that comprises grid openings, wherein said device has a motional element that engages into the grid openings of the rail and thusly initiates a motion of the passenger seats.

DE 10 2008 048 745 A1 describes a locking device for passenger seats that can be locked on a rail, wherein locking bodies installed on a front and a rear end of the passenger seats can be simultaneously actuated by means of an actuating element.

BRIEF SUMMARY OF THE INVENTION

An aspect of the invention may provide a device, by means of which objects can be easily locked and unlocked in a transportation means.

A mounting system for objects in a transportation means is proposed, which comprises a profile rail with a supporting surface, at least one interior facing away from the supporting surface and at least one opening that extends from the supporting surface into the at least one interior, as well as at least one locking device with a base body, which is bringable in surface contact with the supporting surface and which is to be connected to the object, at least one locking body, which extends from the at least one interior of the profile rail to a base body through an opening and which is to be interlocked with the profile rail in order to lock the base body, and an actuating device with an actuating element that at least in certain areas extends parallel to the profile rail and at least one clamping body that is movable relative to the profile rail and is connected to the actuating element. The at least one clamping body is realized in such a way that it exerts a compressive force, which results in the locking body being interlocked with the profile rail, upon a component of the locking device during a motion of the actuating element in a first direction parallel to the profile rail and releases this interlock during a motion of the actuating element in a second, opposite direction.

As initially mentioned, a profile rail may be realized in the form of a so-called "floor rail" that is arranged in the floor of a cabin of the respective transportation means and onto which the objects to be mounted are subsequently placed. The profile rail may comprise a slot that extends in the longitudinal direction and is interspersed, for example, with circular openings in a predefined grid. The at least one interior is a region within the profiled cross section of the profile rail that lies underneath or facing away from the supporting surface and is enclosed between a bottom surface, lateral surfaces and the supporting surface. The cross section of the interior of the profile rail does not necessarily have to be closed, but may also consist of an undercut or a recess extending underneath the supporting surface. It would also be conceivable to provide several functionally separated interiors. The objective of creating at least one interior directly adjacent to the supporting surface can be seen in arranging the object to be mounted and a locking body on two different sides of the supporting surface such that the object can be securely mounted by interlocking the locking body with the profile rail. The type of opening in the supporting surface is not decisive for this function, wherein at least one continuous and uninterrupted slot is considered advantageous for allowing a displacement of the object along the profile rail when the at least one locking body protrudes into the at least one interior of the profile rail.

The locking device is provided for bringing a base body in surface contact with the supporting surface of the profile rail and for realizing an interlock with the profile rail by means of a locking body. As already mentioned above, the interlock refers to clamping a locking body to the profile rail on a side that lies opposite of the supporting surface, wherein the base body, on which the object is to be mounted, and the locking body are arranged on two different sides of the profile rail and clamped thereon.

An aspect of the invention is the actuating device with the actuating element that at least in certain areas extends parallel to the profile rail and at least one clamping body connected thereto. The actuating element could be located on the far side of a plane referred to the supporting surface, wherein said plane coincides with the supporting surface such that the actuating device is optically inconspicuous if the profile rails are integrated into a floor. The actuating element may be located laterally of the profile rail, underneath the profile rail or extend entirely within an interior of the profile rail. During a motion of the actuating element, the at least one clamping body connected to the actuating element accordingly causes a predefined motion that also should at least partially extend in a direction perpendicular to the plane coinciding with the supporting surface. During the motion of the clamping body, a force that is directed at the base body from below and leads to the interlock with the profile rail can therefore be generated in the locking device. If several clamping bodies are distributed along the rail, all locking devices consequently may be interlocked or released by actuating only one actuating element. This provides the particular advantage that it is not necessary to manually interlock or release all locking devices. The actuating element is ideally connected to a control unit that causes a motion of the actuating element along the profile rail at the push of a button. In this way, any number of locking devices and assigned objects mounted on the profile rail may be released or interlocked.

In an advantageous embodiment, the actuating element is a toothed rail that respectively engages into a toothed wheel connected to the at least one clamping body. In this context, a toothed rail should be interpreted as a rod-like elongate component that comprises a planar toothing on at least one side. The toothed rail may be interpreted as a gear rim that is unwound into a plane. The corresponding design on the clamping bodies respectively comprises a toothed wheel, wherein the gearing parameters are compatible with those of the toothed rail such that a reliable motion of the clamping element is carried out when the actuating element is actuated. The clamping body does not necessarily have to be rigidly connected to the respective toothed wheel directly, wherein it would furthermore be conceivable that the toothed wheel has an eccentric bearing point, at which a push rod connected to an eccentric bearing point of a pivotably supported clamping body is arranged. Furthermore, the relevant toothed wheel of a clamping body may also engage into another relatively short toothed rail that carries the clamping body and at least partially extends perpendicular to the plane coinciding with the supporting surface. Due to this simple mechanical deflection, the clamping body may be displaced in the direction of the base body.

In a particularly advantageous embodiment, the clamping body consists of a rotatably supported cam. The cam may have a rounded elongate or tear-like shape, wherein a circumferential contour of the cam is provided with a running surface that comes in functional contact with the relevant component of the locking device. When the cam is turned about a predefined bearing point, the contact line with the relevant component formed on the running surface of the cam changes in the direction of a perpendicular to the plane coinciding with the supporting surface such that the relevant component of the locking device follows this motion. Depending on the design of the locking device, a motion of the locking bodies toward the profile rail can be realized in this way such that the locking bodies and the profile rail are interlocked in an end position of the rotatably supported cam. The utilization of a cam for displacing an element and for applying a clamping force is technically mature, very reliable and practically maintenance-free.

It is furthermore advantageous that the clamping body is rotatably supported on an axle arranged in an interior of the profile rail. During the installation of the system, the relevant clamping body therefore may be placed into the interior in order to subsequently insert an axle through the lateral surfaces of the profile rail and thusly support the clamping body in a rotatable fashion. The support in an interior of the profile rail allows a particularly compact design of the mounting system according to the invention because the actuating element consequently may also extend within the profile rail such that it is barely visible from outside the profile rail. Alternatively, it would also be conceivable that the clamping body is not only supported on the profile rail in a rotatable fashion, but that a shaft section is used instead of an axle, wherein this shaft section is connected to the clamping body in a torque-proof fashion by means of a shaft-hub connection and the actuating element initiates a motion of the clamping body outside the profile rail by means of said shaft section. In this way, the profile rail may be realized in an even more compact fashion if it is possible to arrange the actuating element outside the profile rail.

The profile rail may furthermore be realized in such a way that the actuating element is displaceable in an interior of the profile rail. This may be achieved, e.g., in that a corresponding recess is arranged in the respective interior, wherein said recess extends along the intended direction of displacement of the actuating element and, for example, has a sliding fit with the lateral surfaces of the actuating element. The integration of at least one clamping body after the placement of the actuating element into the interior of the profile rail results in the actuating element no longer being able to automatically release from the profile rail. It is therefore apparently not absolutely imperative to provide an additional safety.

It is particularly advantageous if the mounting system comprises a plurality of locking devices that are lined up along the profile rail in a predefined grid and connected to the actuating element. A certain grid is chosen depending on the considered maximum or minimum displacements of the passenger seats or other objects in the transportation means. If the profile rail comprises a slot that is interspersed with several circular openings as described above, the corresponding locking devices could be arranged in the same grid as these openings.

If a one-inch grid is used for these openings, however, a very large number of clamping bodies would be required and have to be moved by means of the actuating element, particularly in larger cabins. In order to lower the weight and to reduce the complexity, it may therefore be advantageous to use a slightly larger grid that is adapted, e.g., to the difference between the seat clearances of two seating classes or to the smallest common denominator between several seat clearance differences of several seating classes. In the integration into a passenger cabin of an aircraft for accommodating passenger seats, it would be conceivable to choose a respective spacing of 5 inches.

It is likewise advantageous that the mounting system comprises a driving element that is connected to the actuating element and adapted for selectively moving the actuating element into the first and the second direction. Depending on the design of the actuating element, it may be advantageous to utilize an electric motor that engages into the actuating element with a toothed wheel or moves this actuating element by means of a cam or the like. The driving element may be connected to a control device of the transportation means in order to automatically realize, if so required, a predefined displacement of the actuating element in the first or the second direction with a corresponding command. Consequently, a complete interlock or a complete release of the objects to be mounted can be realized in the transportation means at the push of a button.

In an advantageous embodiment, the at least one locking body is rigidly arranged on the base body and the locking device is designed for pressing the base body or the at least one locking body against a surface in an interior of the profile rail that lies opposite of the supporting surface. Alternatively, the locking device may also exert a force upon a part of the base body such that locking bodies rigidly arranged thereon are pressed against a surface in an interior of the profile rail that lies opposite of the supporting surface.

This makes it possible, in principle, to eliminate the displaceable support of locking bodies relative to a base body such that the complexity of the system is significantly reduced.

The preceding description of an actuating element should be interpreted as an example. It is naturally also possible to utilize flexible or elastic elements as actuating elements that are primarily able to transmit a tensile force. These may include belts or chains that are preferably guided in a circulating fashion.

The mounting system may furthermore comprise a gripping head that is movably supported relative to the profile rail and arranged between the at least one clamping body and the relevant component of the locking device in order to be acted upon with the compressive force of the clamping body and to transmit this force to the locking device. The direction, in which the force is applied to the relevant component of the locking device, therefore is very consistent and largely independent of the shape of the at least one clamping body.

It may furthermore be advantageous to provide a mushroom head that is in contact with the at least one clamping body and transmits the compressive force of the at least one clamping body to the gripping head by means of a spring arranged between the gripping head and the mushroom head. The compressibility of the spring prevents mechanical jamming and improves the reliability.

The invention furthermore relates to a transportation means having a space, at least one object located in the space, as well as at least one mounting system according to the invention. The profile rail advantageously extends in a floor of a cabin.

The at least one object may be an element that is selected from a group of elements, with said group comprising passenger seats, partition walls and cabin monuments. The term "cabin monuments" includes all three-dimensional pieces of equipment that are provided in a cabin of a transportation means in addition to the passenger seats and located within the cabin in order to perform certain cabin functions.

BRIEF DESCRIPTION OF THE DRAWINGS

Other characteristics, advantages and potential applications of the present invention result from the following description of embodiments illustrated in the figures. In this respect, all described and/or graphically illustrated characteristics form the object of the invention individually and in arbitrary combination, namely regardless of their composition in the individual claims or their references to other claims. In these figures, identical or similar objects are furthermore identified by the same reference symbols.

DETAILED DESCRIPTION

Figure 1:
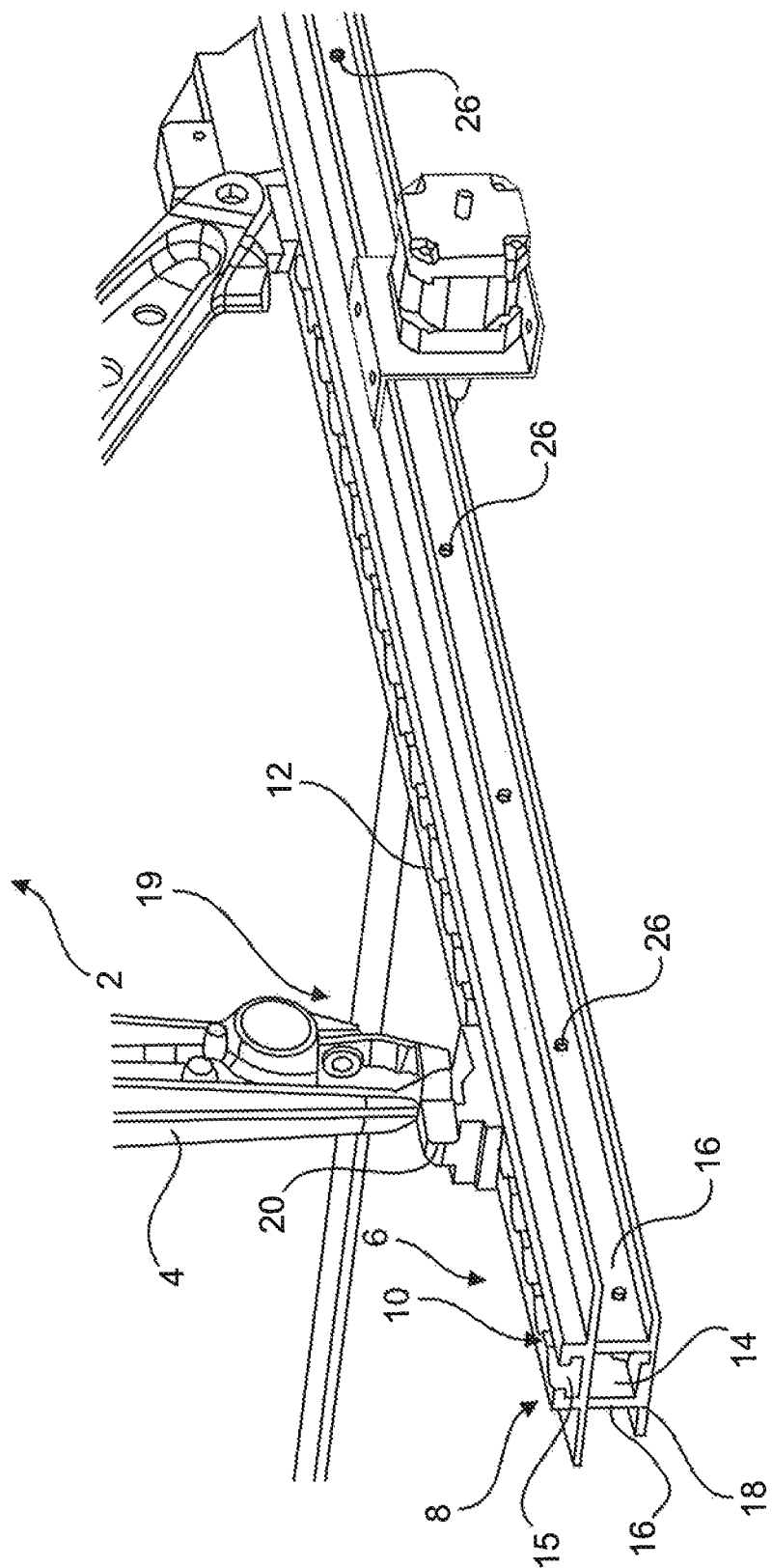
FIG. 1 shows the mounting of passenger seats in the form of a general view.

FIG. 1 shows an exemplary design of the profile rail 6. The profile rail 6 has a supporting surface 8 that faces a space of the transportation means and several passenger seats 2 that are merely indicated in the form of frames, 4. In its supporting surface 8, the profile rail 6 comprises a slot 10 that is interspersed with circular openings 12. The slot 10 and the circular openings can be generally referred to as "openings". Two interiors 14 and 15 are formed on top of one another in a region underneath the supporting surface, wherein these interiors may be closed, for example, with lateral surfaces 16 and a bottom surface 18 and separated from one another by a web in certain areas. The at least one clamping body (not illustrated in this figure) that is actuatable by means of an actuating element (not illustrated in this figure) is arranged in the bottom interior 15. The profile rail 6 is comparable to a conventional profile rail for a cabin of an aircraft that comprises a widening with the (bottom) interior 14 on its underside.

The frame 4 is connected to a base body 20 that is slidable on the supporting surface 8. Base bodies 20 are guidable along the profile rail 6 by means of locking bodies that protrude into the profile rail 6 through the respective openings 10 and 12.

Figure 2:
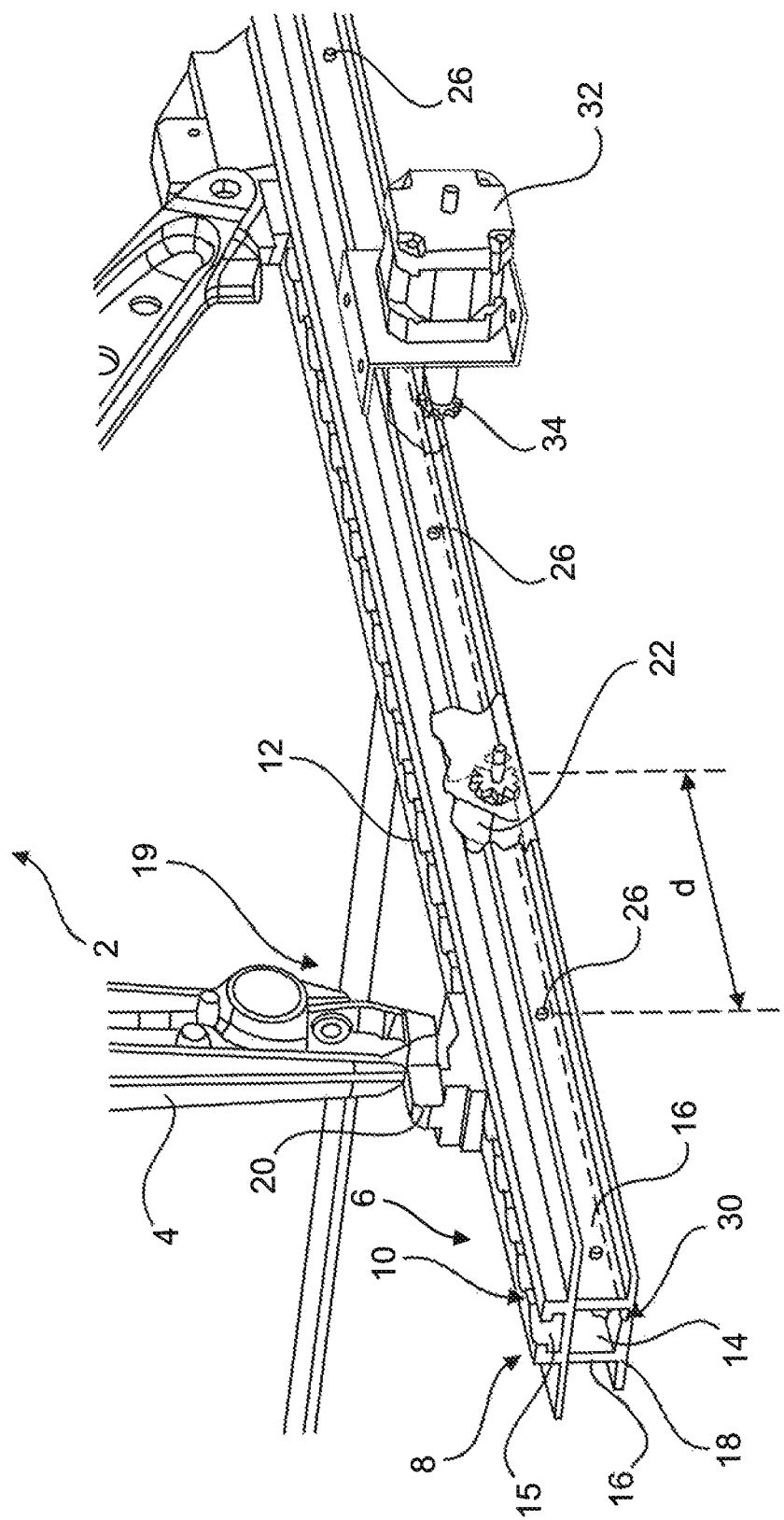
FIG. 2 shows the mounting of the passenger seats of FIG. 2 in the form of a partially transparent general view.

FIG. 2 shows several clamping bodies 22 that are realized in a cam-like fashion and comprise a running surface 24 in the form of a partially transparent drawing. The clamping bodies 22 are distributed in the interior 15 of the profile rail 6 in a predefined grid spacing d and respectively supported in a rotatable fashion between the lateral surfaces 16 by means of an axle 26. Each clamping body 22 is connected in a torque-proof fashion to a toothed wheel 28 that is engaged with an actuating element 30. The actuating element 30 is illustrated in greater detail in FIG. 3 and displaced parallel to the profile rail 6 by means of a driving device 32 that comprises a toothed wheel 34.

Figure 3:
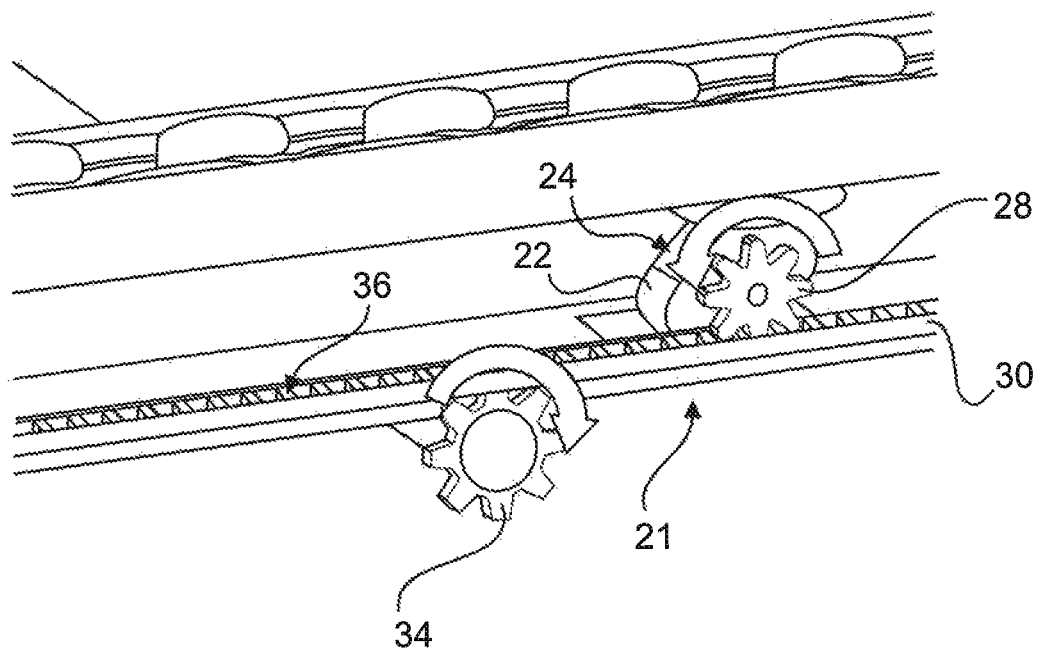
FIG. 3 shows an illustration of an actuating element, a driving device and a clamping body.

According to FIG. 3, the exemplary actuating element is realized in the form of a toothed rail, into which a toothed wheel 28 connected to a clamping body 22 engages. If the actuating element 30 is moved in a first direction (toward the right in the plane of projection), the toothed wheel 28 rotates counterclockwise and the clamping body 22 is raised in the interior 14 of the profile rail 6. The motion of the actuating element 30 may be realized by means of the toothed wheel 34 that would have to rotate clockwise in the illustration shown. The toothed wheel 34 connected to the driving device is located, for example, underneath the profile rail 6 and engages into a gearing arranged on the far side of the profile rail 6 referred to the supporting surface 8. Rather than providing a massive rigid body with two separate gearings, the actuating element 30 could preferably also be realized in such a way that a grid of recesses is provided, into which the toothed wheels 28 and 34 are engageable on both sides.

Figure 4:
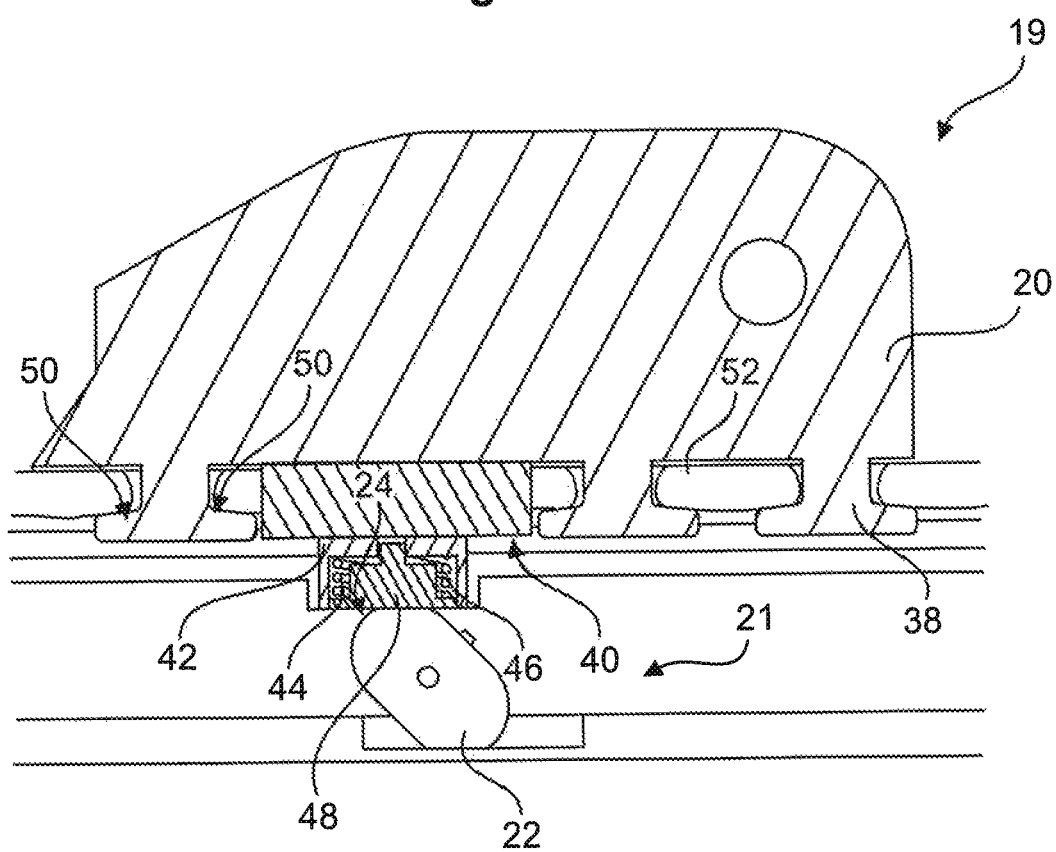
FIG. 4 shows a sectional illustration of part of the mounting system with several locking bodies in a locked state.

FIG. 4 shows a lateral section through the base body 20, on which several locking bodies 38 are rigidly arranged. This means that the locking bodies 38 and the base body 20 form an integral component. One region of the base body 20 comprises a force application surface 40 that is bringable in surface contact with a gripping head 42. The gripping head comprises a groove 44, in which a pressure spring 46 provided with a mushroom head 48 is positioned. The mushroom head 48 is movable relative to the gripping head 42 in a direction extending perpendicular to a plane that includes the supporting surface 8. The clamping body realized in the form of a cam 22 is pivotable such that the mushroom head 48 slides on its running surface 24 and is moved toward or away from the force application surface 40. The base body 20 is slightly raised in the vertical direction by applying a compressive force resulting thereof to the force application surface 40 such that the locking bodies 38 connected to the base body produce a non-positive connection with contours 52 of the openings 12 by means of their flanks 50. This means that the base body 20 is interlocked on the profile rail 6 when the mushroom head 48 is pressed toward the supporting surface 8.

Figure 5:
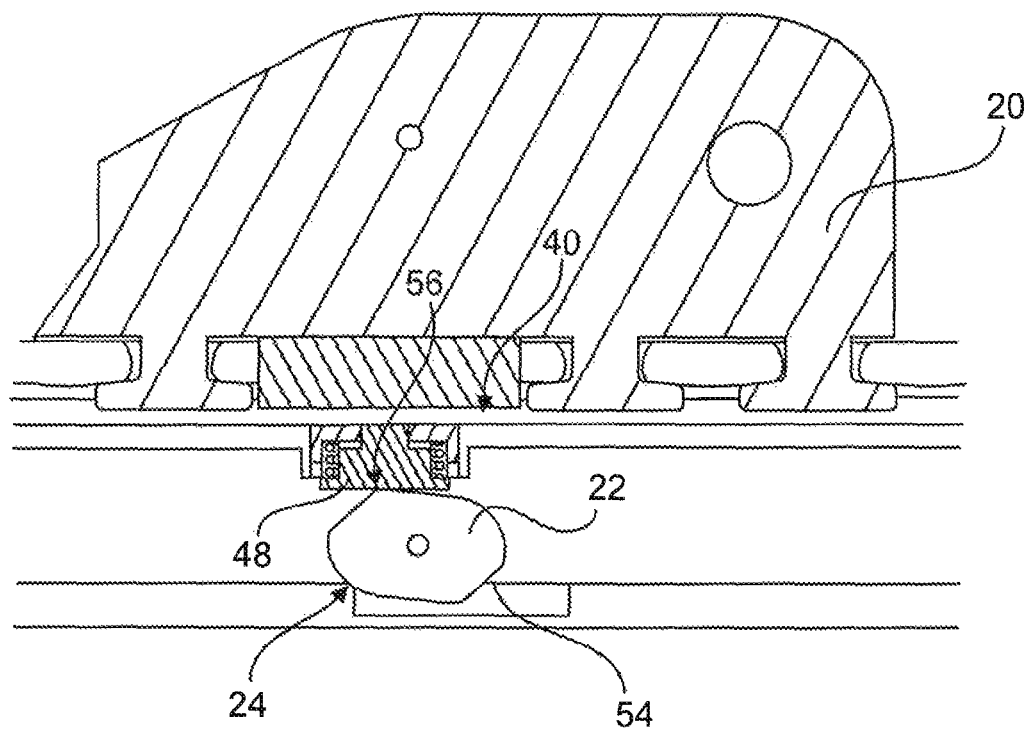
FIG. 5 shows the sectional illustration of FIG. 4 in an unlocked state.

In a different position of the clamping body in the form of a cam 22 that is illustrated in FIG. 5, the mushroom head 48 is in a relaxed position such that no force acts upon the force application surface 40. Consequently, the base body 20 respectively can move freely within or on the profile rail 2. When the interlock is released, any connection between the base body 20 or the object arranged thereon and the profile rail is therefore separated. The base body 20 is movable along the profile rail 2 immediately after the clamping body 22 has been pivoted.

In order to prevent an automatic release, the running surface 24 may comprise a flattening 54 that only releases the interlock if the clamping body 22 is moved back beyond a kink 56. Consequently, this kink 56 needs to be actively overcome when changing from an unlocked position to a locked position, as well as when changing from a locked to an unlocked position. An intensity of the self-locking effect is adjustable in dependence on the design and the severity of the kink 56.

Figure 6:
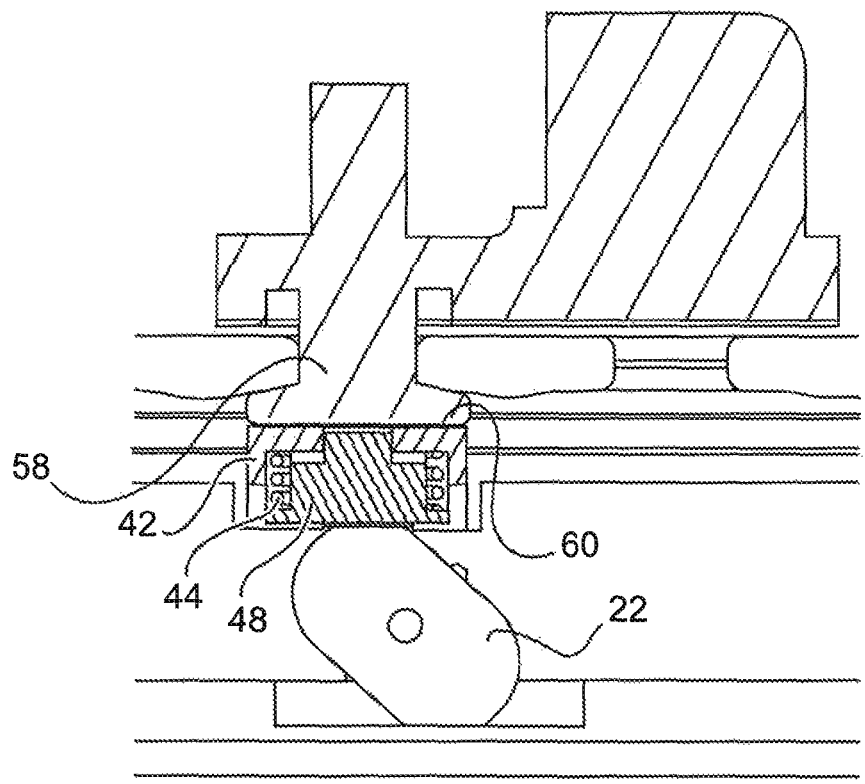
FIG. 6 shows a sectional illustration of part of the mounting system with a locking body in a locked state.
Figure 7:
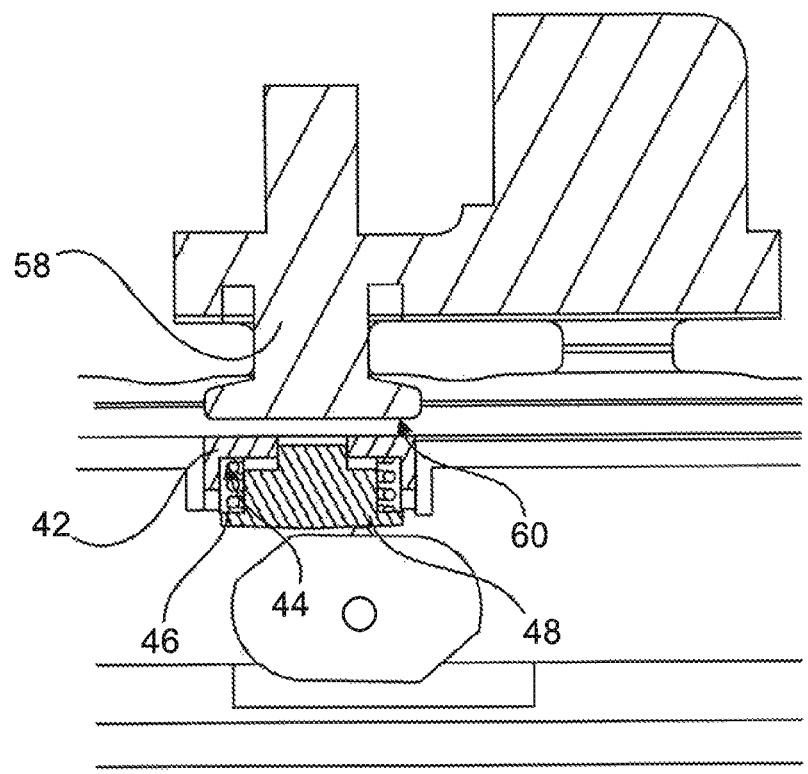
FIG. 7 shows the sectional illustration of FIG. 6 in an unlocked state.

As an alternative to applying a force directly to the base body 20, it may also be advantageous to apply a force directly into the locking body 58 in accordance with FIG. 6 such that a force application surface 60 is provided directly on the locking body 58. This may be advantageous, for example, for mounting a front end of the frame 4. FIG. 6 shows the interlocked position whereas FIG. 7 demonstrates that no connection exists between the gripping head 42 and the locking body 58 in the unlocked position.

Figure 8:
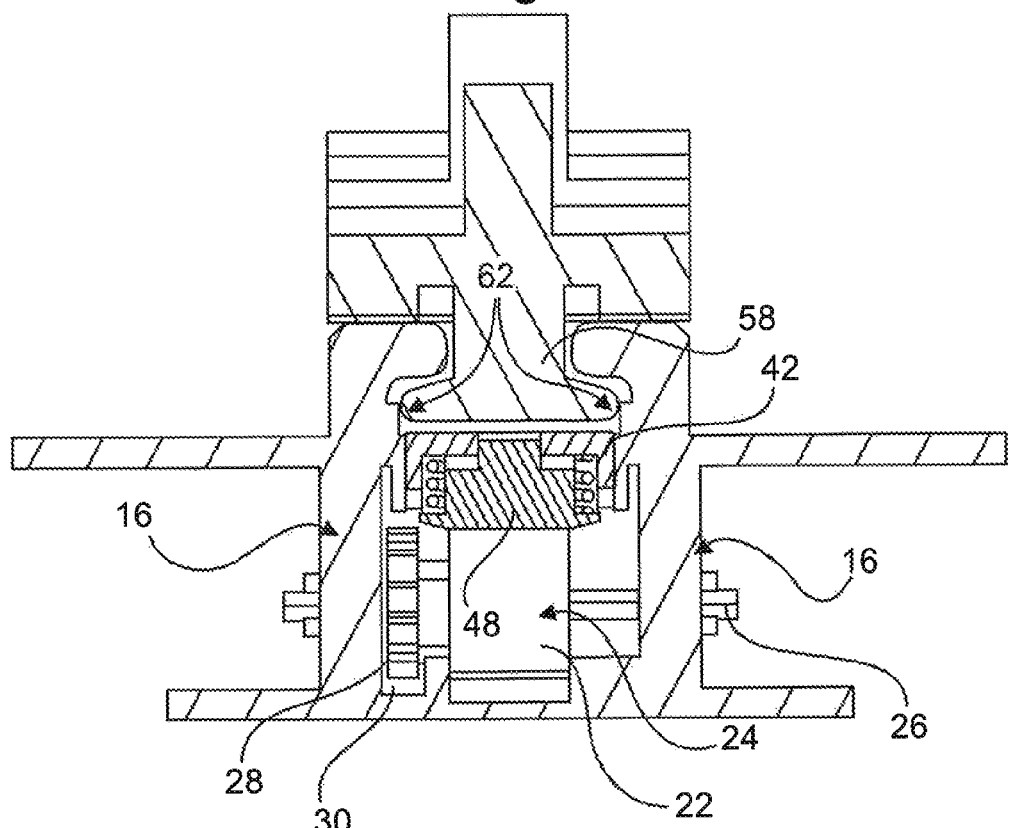
FIG. 8 ultimately shows a sectional illustration of the mounting system transverse to a longitudinal direction of the profile rail.

FIG. 8 ultimately once again shows the overall design in the form of a sectional illustration from a different perspective. A clamping body realized in the form of a cam 22 is supported in a rotatable fashion between two lateral surfaces 16 of the profile rail 2 by means of the axle 26 and connected in a torque-proof fashion to a toothed wheel 28. An actuating element 30, into which the toothed wheel 28 engages, is arranged directly underneath the toothed wheel 28. The toothed wheel 28 is set in motion when the actuating element 30 is moved such that the running surface 24 of the clamping body 22 slides along the mushroom head 48. The mushroom head 48 is more or less pressed toward the gripping head 42 depending on the rotating position such that a force effect or a release of the locking body 58 is achieved.

In order to improve the force application, the position of the locking body 58 relative to the gripping head 42 should be relatively precise such that it is advantageous to provide guide flanks 62 within the profile rail 2.

As a supplement, it should be noted that "comprising" does not exclude any other elements or steps and that "a" or "an" does not exclude a plurality. It should furthermore be noted that characteristics, which were described with reference to one of the above exemplary embodiments, can also be used in combination with other characteristics of other above-described described exemplary embodiments. Reference symbols in the claims should not be interpreted in a restrictive sense.

The invention claimed is:

1. A mounting system for an object in a transportation means, comprising:
    a profile rail with a supporting surface, at least one interior facing away from the supporting surface and at least one opening extending from the supporting surface into the at least one interior,
    at least one locking device with a base body that is bringable in surface contact with the supporting surface and which is to be connected to the object, and at least one locking body extending from the at least one interior of the profile rail to the base body through an opening and is interlocked with the profile rail in order to lock the base body; and
    an actuating device with an actuating element that at least in certain areas extends parallel to the profile rail and at least one clamping body movable relative to the profile rail and connected to the actuating element,
    wherein the at least one clamping body is configured to exert a compressive force, which results in the locking body being interlocked, upon a component of the locking device during a motion of the actuating element in a first direction parallel to the profile rail and to release the interlock during a motion of the actuating element in a second, opposite direction, and
    wherein the clamping body comprises a rotatably supported cam.

2. The mounting system of claim 1, wherein the actuating element comprises a toothed rail that respectively engages into a toothed wheel connected to the at least one clamping body.

3. A mounting system for an object in a transportation system, comprising:
    a profile rail with a supporting surface, at least one interior facing away from the supporting surface and at least one opening extending from the supporting surface into the at least one interior,
    at least one locking device with a base body that is bringable in surface contact with the supporting surface and which is to be connected to the object, and at least one locking body extending from the at least one interior of the profile rail to the base body through an opening and is interlocked with the profile rail in order to lock the base body; and
    an actuating device with an actuating element that at least in certain areas extends parallel to the profile rail and at least one clamping body movable relative to the profile rail and connected to the actuating element,
    wherein the at least one clamping body is configured to exert a compressive force, which results in the locking body being interlocked, upon a component of the locking device during a motion of the actuating element in a first direction parallel to the profile rail and to release the interlock during a motion of the actuating element in a second, opposite direction, and
    wherein the clamping body is rotatably supported on an axle arranged in an interior of the profile rail.

4. The mounting system of claim 1, wherein the actuating element is movably supported in an interior of the profile rail.

5. The mounting system of claim 1, further comprising several locking devices that are lined up along the profile rail in a predefined grid and connected to the actuating element.

6. The mounting system of claim 1, further comprising a drive unit connected to the actuating element and configured for selectively moving the actuating element in the first and the second directions.

7. The mounting system of claim 1, wherein the at least one locking body is rigidly arranged on the base body and the at least one locking device is configured for pressing the base body or the at least one locking body against a surface in an interior of the profile rail that lies opposite of the supporting surface.

8. The mounting system of claim 1, further comprising a gripping head movably supported relative to the profile rail and arranged between the at least one clamping body and the component of the locking device in order to be acted upon with the compressive force by the clamping body and to transmit the compressive force to the locking device.

9. The mounting system of claim 8, further comprising a mushroom head in contact with the at least one clamping body and transmitting the compressive force of the at least one clamping body to the gripping head by a spring arranged between the gripping head and the mushroom head.

10. A transportation means, comprising a space, at least one object to be mounted therein and at least one mounting system, the mounting system comprising:
- a profile rail with a supporting surface, at least one interior facing away from the supporting surface and at least one opening extending from the supporting surface into the at least one interior;
- at least one locking device with a base body that is bringable in surface contact with the supporting surface and which is to be connected to the object, and at least one locking body extending from the at least one interior of the profile rail to the base body through an opening and is interlocked with the profile rail in order to lock the base body;
- an actuating device with an actuating element that at least in certain areas extends parallel to the profile rail and at least one clamping body movable relative to the profile rail and connected to the actuating element;
- a gripping head movably supported relative to the profile rail and arranged between the at least one clamping body and a component of the locking device in order to be acted upon with a compressive force by the clamping body and to transmit the compressive force to the locking device; and
- a mushroom head in contact with the at least one clamping body and transmitting the compressive force of the at least one clamping body to the gripping head by a spring arranged between the gripping head and the mushroom head, wherein the at least one clamping body is configured to exert the compressive force, which results in the locking body being interlocked, upon the component of the locking device during a motion of the actuating element in a first direction parallel to the profile rail and to release the interlock during a motion of the actuating element in a second, opposite direction.

11. The transportation means of claim 10, wherein the at least one object is selected from a group of elements, with said group consisting of:
passenger seats,
partition walls, and
cabin monuments.

* * * * *